(12) United States Patent
Park

(10) Patent No.: US 10,668,661 B2
(45) Date of Patent: Jun. 2, 2020

(54) METHOD OF MANUFACTURING PRODUCT HAVING COMPLEX SHAPE BY USING AT LEAST ONE JIG AND AT LEAST ONE MANDREL

(71) Applicant: River Runs CO., LTD., Kimhae-si, Gyeongsangnam-do (KR)

(72) Inventor: Chulhyun Park, Incheon-si (KR)

(73) Assignee: RIVER RUNS CO., LTD., Kimhae-si, Gyeongsangnam-Do (KR)

( * ) Notice: Subject to any disclaimer, the term of this patent is extended or adjusted under 35 U.S.C. 154(b) by 295 days.

(21) Appl. No.: 15/571,400

(22) PCT Filed: Dec. 12, 2016

(86) PCT No.: PCT/KR2016/014509
§ 371 (c)(1),
(2) Date: Nov. 2, 2017

(87) PCT Pub. No.: WO2018/048031
PCT Pub. Date: Mar. 15, 2018

(65) Prior Publication Data
US 2019/0152130 A1 May 23, 2019

(30) Foreign Application Priority Data
Sep. 8, 2016 (KR) .......................... 10-2016-0115560

(51) Int. Cl.
*B29C 53/82* (2006.01)
*B29C 70/46* (2006.01)
(Continued)

(52) U.S. Cl.
CPC ............ *B29C 53/828* (2013.01); *B29C 53/82* (2013.01); *B29C 70/46* (2013.01); *B29C 53/38* (2013.01);
(Continued)

(58) Field of Classification Search
CPC ....... B29C 53/828; B29C 53/56; B29C 53/84; B29C 70/30; B29K 2105/087; B29L 2031/5227; B29L 2031/7002
See application file for complete search history.

(56) References Cited

U.S. PATENT DOCUMENTS 5,347,743 A * 9/1994 Tokuda .................. A01K 87/04
43/24
6,128,849 A * 10/2000 Sunaga ................ A01K 87/005
43/18.1 CT

FOREIGN PATENT DOCUMENTS

JP 2001-246673 A 9/2001
JP 2002-058763 A 2/2002
(Continued)

*Primary Examiner* — Peter L Vajda
*Assistant Examiner* — S. Behrooz Ghorishi
(74) *Attorney, Agent, or Firm* — Novick, Kim & Lee, PLLC; Jae Youn Kim

(57) ABSTRACT

Provided herein is a method of manufacturing a product having a complex shape by using at least one jig and at least one mandrel. The method of manufacturing a product having a complex shape by using at least one jig and at least one mandrel is configured to include: a preparation step of preparing a prepreg sheet and a cylindrical first mandrel around which the prepreg sheet is wound; a first rolling step of forming a first stacking surface by winding the prepreg sheet around the first mandrel; a second mandrel preparation step of locating a second mandrel on the outer circumferential surface of the first stacking surface; a second rolling step of forming a second stacking surface by winding the first stacking surface and the second mandrel with the prepreg sheet; and a core removal step of removing the first mandrel and the second mandrel.

2 Claims, 14 Drawing Sheets

(51) Int. Cl.
  *B29C 53/84* (2006.01)
  *B29C 53/38* (2006.01)
  *B29C 53/42* (2006.01)
  *B29C 53/56* (2006.01)
  *B29C 70/30* (2006.01)
  *B29K 105/08* (2006.01)
  *B29L 31/52* (2006.01)
  *B29L 31/00* (2006.01)

(52) U.S. Cl.
  CPC .............. *B29C 53/42* (2013.01); *B29C 53/56* (2013.01); *B29C 53/84* (2013.01); *B29C 70/30* (2013.01); *B29K 2105/0872* (2013.01); *B29L 2031/5227* (2013.01); *B29L 2031/7002* (2013.01)

(56) References Cited

FOREIGN PATENT DOCUMENTS

| | | |
|---|---|---|
| JP | 2007-203468 A | 8/2007 |
| JP | 5431285 B2 * | 3/2014 |
| JP | 5431285 B2 | 3/2014 |
| KR | 10-1552315 B1 | 9/2015 |

* cited by examiner

METHOD OF MANUFACTURING PRODUCT HAVING COMPLEX SHAPE BY USING AT LEAST ONE JIG AND AT LEAST ONE MANDREL

TECHNICAL FIELD

The present invention relates to a method of manufacturing a product having a complex shape by using at least one jig and at least one mandrel, and more specifically to a method of manufacturing a product having a complex shape by using at least one jig and at least one mandrel, which is capable of manufacturing a product having a complex shape by using a plurality of jigs and mandrels.

BACKGROUND ART

Generally, a manufacturing method using a prepreg is used to manufacture strong and robust products, such as a fishing rod guide, a golf club, a fishing rod body, a ski pole, an alpenstock, an archery arrow shaft, a selfie stick, a tripod, a billiard cue, etc.

However, conventional products using prepregs are chiefly used as products having simple shapes due to difficulties in the machining of prepreg materials. Accordingly, the conventional method has a problem in that it is difficult to manufacture a product having a complex shape.

DISCLOSURE

Technical Problem

The present invention has been conceived to overcome the above-described problem of the conventional art, and an object of the present invention is to provide a method of manufacturing a product having a complex shape by using at least one jig and at least one mandrel, which is capable of manufacturing a product having a complex shape by manufacturing a prepreg sheet by using a plurality of jigs and mandrels.

Another object of the present invention is to provide a method of manufacturing a product having a complex shape by using at least one jig and at least one mandrel, which is capable of manufacturing a strong and robust product because the product is manufactured using at least one jig and at least one mandrel and thus the product is formed in a complex shape but in an integrated shape.

The technical problems which the present invention is intended to overcome are not limited to those described above, and other technical problems which the present invention is intended to overcome will be clearly understood from the following description by those having ordinary knowledge in the art to which the present invention pertains.

Technical Solution

A method of manufacturing a product having a complex shape by using at least one jig and at least one mandrel according to the present invention is configured to include: a preparation step of preparing a prepreg sheet and a cylindrical first mandrel around which the prepreg sheet is wound; a first rolling step of forming a first stacking surface by winding the prepreg sheet around the first mandrel; a second mandrel preparation step of locating a second mandrel on the outer circumferential surface of the first stacking surface; a second rolling step of forming a second stacking surface by winding the first stacking surface and the second mandrel with the prepreg sheet; and a core removal step of removing the first mandrel and the second mandrel.

Advantageous Effects

According to an embodiment of the present invention, the present invention has been conceived to overcome the above-described problem of the conventional art, and there is provided the method of manufacturing a product having a complex shape by using at least one jig and at least one mandrel, which is capable of manufacturing a product having a complex shape by manufacturing a prepreg sheet by using a plurality of jigs and mandrels.

Furthermore, there is provided the method of manufacturing a product having a complex shape by using at least one jig and at least one mandrel, which is capable of manufacturing a strong and robust product because the product is manufactured using at least one jig and at least one mandrel and thus the product is formed in a complex shape but in an integrated shape.

Figure 1:
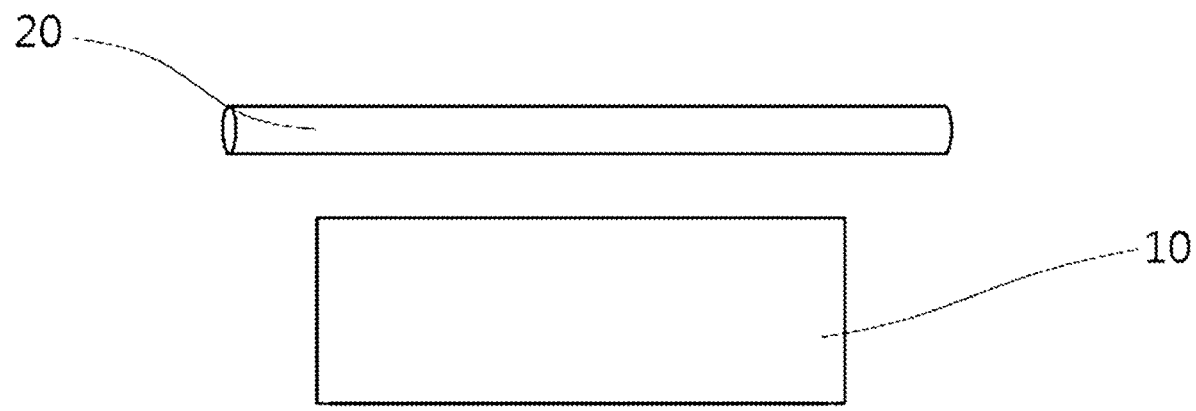
FIG. 1 is a view showing the preparation step of a method of manufacturing a product having a complex shape by using at least one jig and at least one mandrel according to a first embodiment of the present invention.

10: prepreg sheet
20: first mandrel
30: second mandrel
40: first stacking surface
50: second stacking surface
60: combined stacking surface
80: third mandrel
110: preparation step
120: first rolling step
130: first heating step
140: second mandrel preparation step
150: second rolling step
160: second heating step
170: core removal step
180: third mandrel preparation step
190: third heating step
210: preparation step
220: first rolling step
230: second mandrel preparation step
240: pressing step
250: heating step
260: core removal step

MODE FOR INVENTION

Specific details including the technical problems, technical solution, and advantageous effects of the present invention are included in the following embodiments and the accompanying drawings. The advantages and features of the present invention and methods for achieving the advantages and the features will be apparent by reference to embodiments that will be described in detail below in conjunction with the accompanying drawings.

The present invention will be described in detail below with reference to the accompanying drawings First Embodiment As shown in FIGS. 1 to 11, a method of manufacturing a product having a complex shape by using at least one jig and at least one mandrel according to the present invention may be configured to include a preparation step 110, a first rolling step 120, a first heating step 130, a second mandrel preparation step 140, a second rolling step 150, a second heating step 160, and a core removal step 170.

First, the preparation step 110 is the step of preparing a prepreg sheet 10 and a cylindrical first mandrel 20 around which the prepreg sheet 10 is wound, as shown in FIG. 1. The prepreg sheet 10 is made of a material which is shaped using a method of stacking, and heating or pressing a material, and is provided in the shape of a sheet made of carbon or the like.

Figure 2:
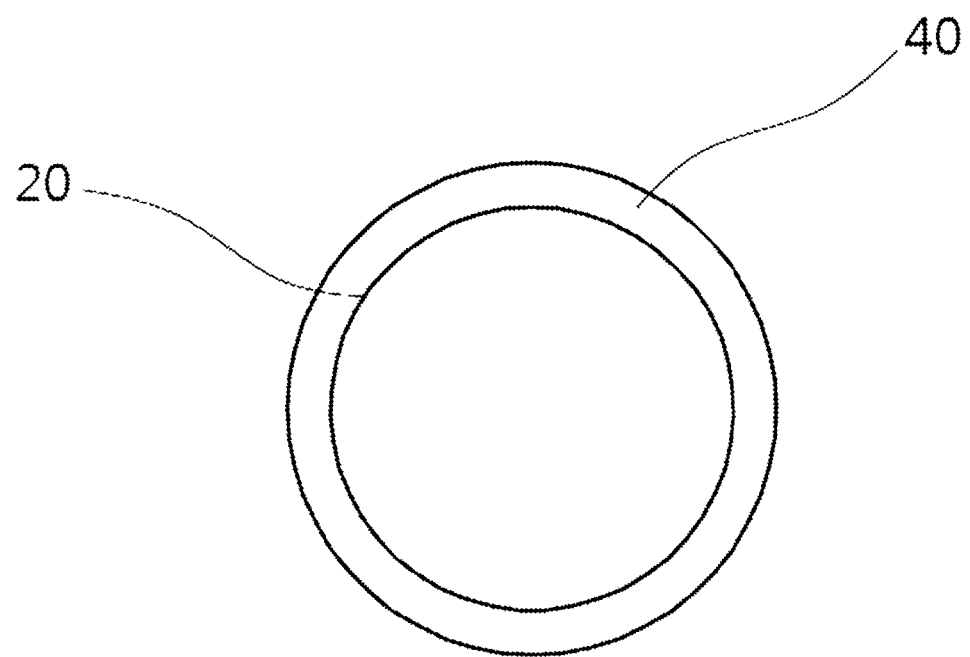
FIG. 2 is a view showing the first rolling step of the method of manufacturing a product having a complex shape by using at least one jig and at least one mandrel according to the first embodiment of the present invention.

Next, the first rolling step 120 is the step of forming a first stacking surface 40 by winding the prepreg sheet 10 around the first mandrel 20, as shown in FIG. 2. A method of winding the prepreg sheet 10 may include a method of rotating the first mandrel 20 after an end of the prepreg sheet 10 has been attached to the first mandrel 20, and a method of fastening the first mandrel 20 and winding the prepreg sheet 10 around the first mandrel 20.

Next, the first heating step 130 is the step of taping and heating the first stacking surface 40 after the first rolling step 120 has been performed. At the first heating step 130, the prepreg sheet 10 is fastened not to be unwound by taping the first stacking surface 40, and the prepreg sheet 10 is combined by heating the first stacking surface 40 constituting the first stacking surface 40.

Figure 3:
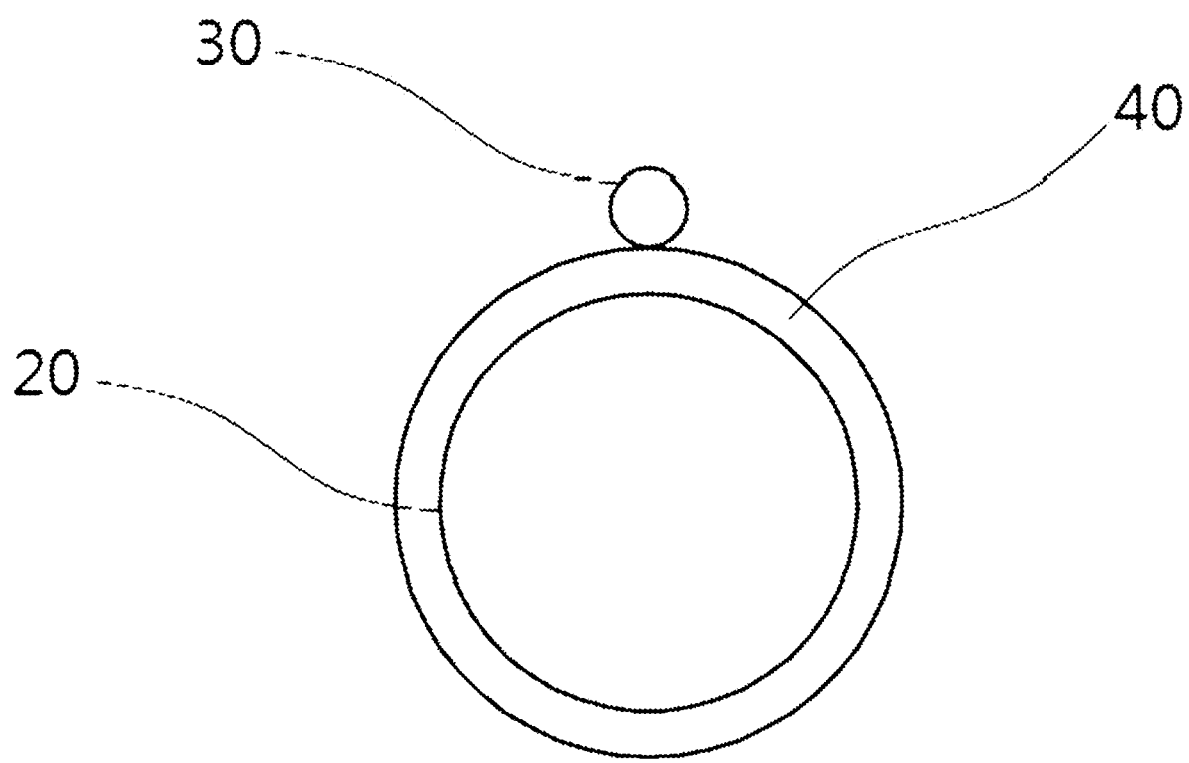
FIG. 3 is a view showing the second mandrel preparation step of the method of manufacturing a product having a complex shape by using at least one jig and at least one mandrel according to the first embodiment of the present invention.

Next, the second mandrel preparation step 140 is the step of locating the second mandrel 30 at one point of the outer circumferential surface of the first stacking surface 40, as shown in FIG. 3. The second mandrel 30 is preferably formed in a cylindrical shape, and the size thereof is preferably smaller than that of the first mandrel 20. The second mandrel 30 may be formed in various shapes. In particular, the second mandrel 30 may be provided as a jig having one of various non-cylindrical shapes, such as a triangular shape, a rectangular shape, a lozenge shape, etc.

Figure 4:
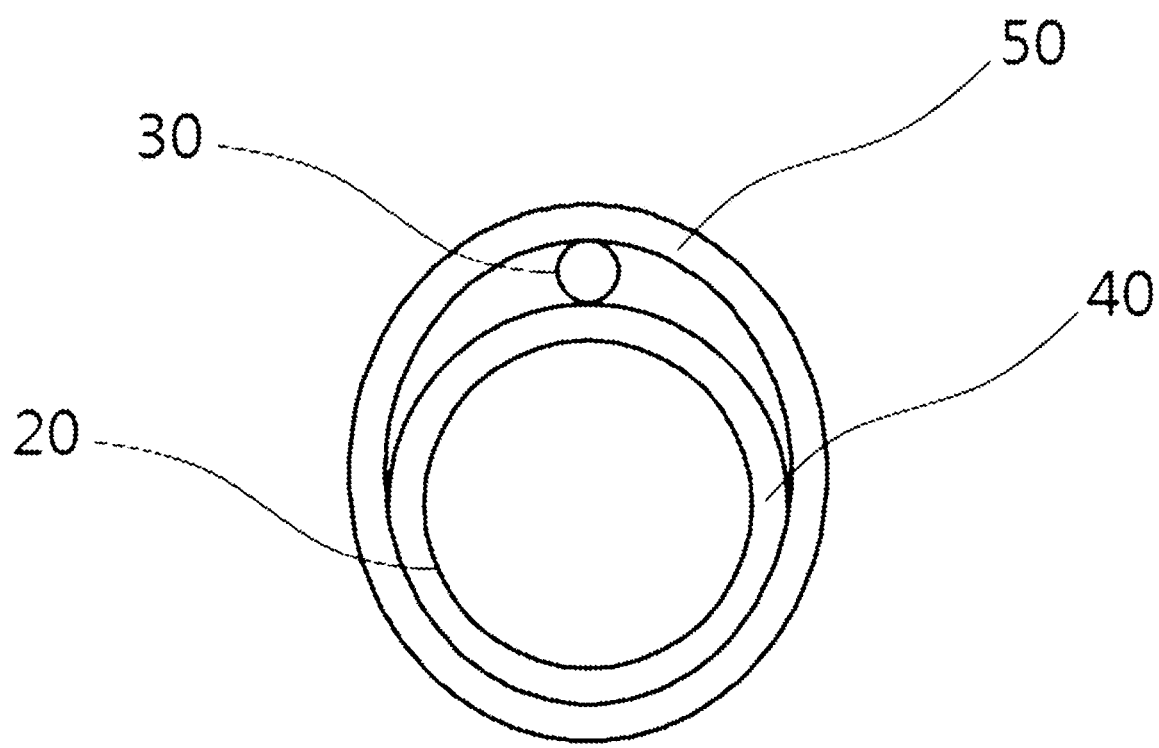
FIG. 4 is a view showing the second rolling step of the method of manufacturing a product having a complex shape by using at least one jig and at least one mandrel according to the first embodiment of the present invention.

Next, the second rolling step 150 is the step of forming a second stacking surface 50 by winding the first stacking surface 40 and the second mandrel 30 with the prepreg sheet 10, as shown in FIG. 4.

Figure 7:
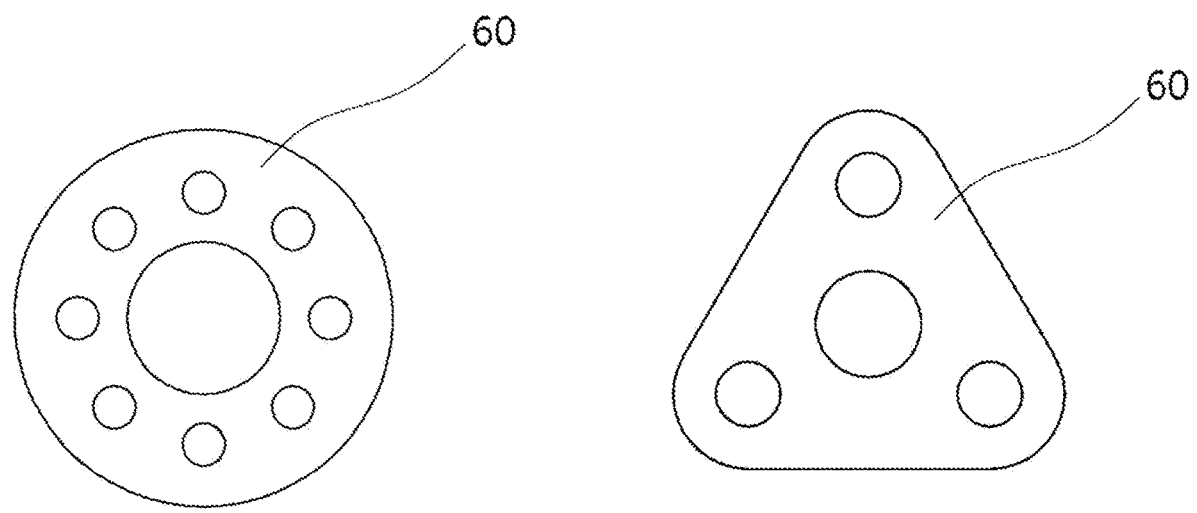
FIG. 7 is a view showing products completed based on the numbers of mandrels in the method of manufacturing a product having a complex shape by using at least one jig and at least one mandrel according to the first embodiment of the present invention.

When a product having a more complex shape is required, a more complex product may be manufactured by installing a plurality of second mandrels 30, as shown in FIG. 7.

Next, the second heating step 160 is the step of taping and heating the second stacking surface 50 after the second rolling step 150 has been performed. At the second heating step 160, a combined stacking surface 60 is formed by combining the first stacking surface 40 and the second stacking surface 50 by heating the second stacking surface 50, and a hole formed between the first stacking surface 40 and the second stacking surface 50 is filled up. Since the prepreg sheet 10 is made of the material having the property of expanding with heat, the hole is filled up.

Figure 5:
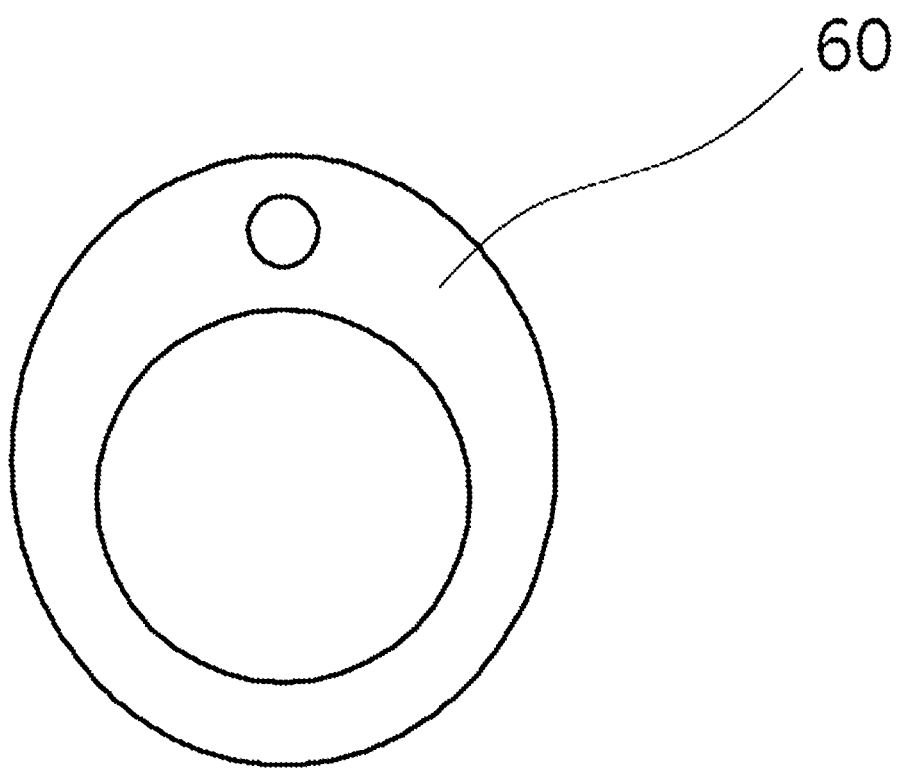
FIG. 5 is a view showing the second heating step and core removal step of the method of manufacturing a product having a complex shape by using at least one jig and at least one mandrel according to the first embodiment of the present invention.
Figure 6:
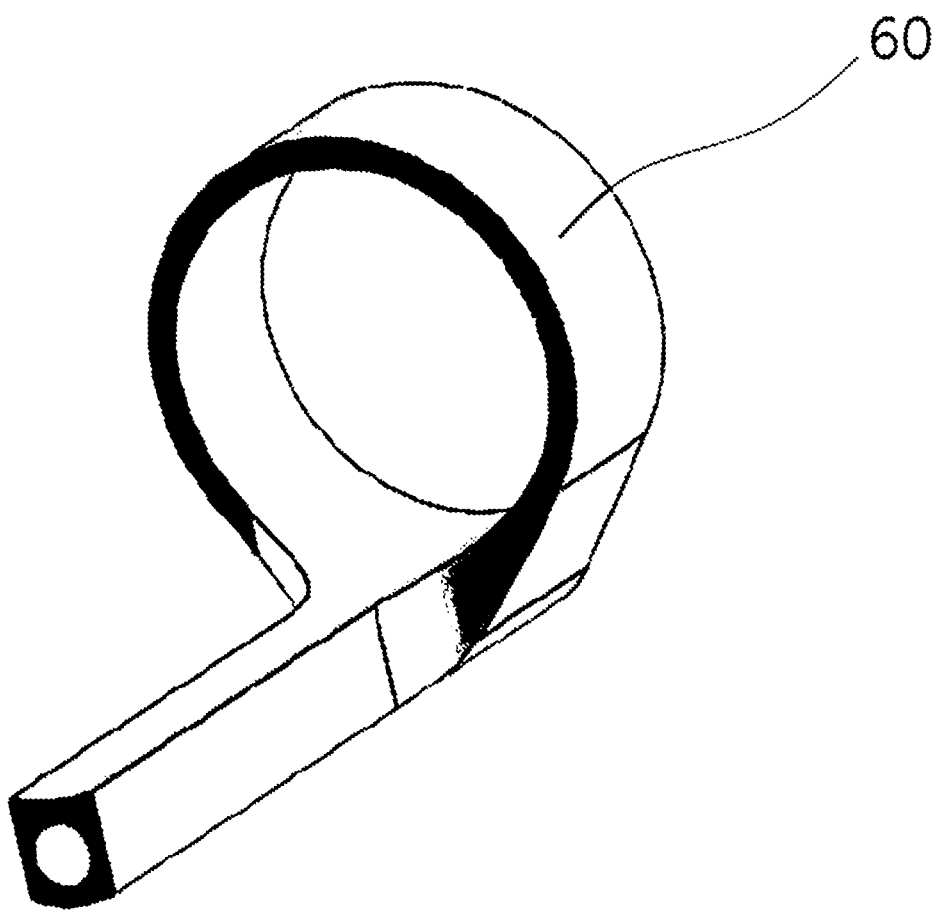
FIG. 6 is a view showing a top guide of a fishing rod which is formed through separate machining after the core removal step of the method of manufacturing a product having a complex shape by using at least one jig and at least one mandrel according to the first embodiment of the present invention has been performed.

Next, the core removal step 170 is the step of removing the first mandrel 20 and the second mandrel 30 after the first stacking surface 40 and the second stacking surface 50 have been combined at the second heating step 160, as shown in FIG. 5. The first mandrel 20 and second mandrel 30 are removed by the core removal step 170, and only the prepreg sheet 10 remains in the form of a product having a complex shape. When the product formed by this step is machined, it may be used as a top guide of a fishing rod, as shown in FIG. 6. A hole formed by the second mandrel 30 is a portion into which the fishing rod is inserted, and thus the top guide may be easily installed and used on the fishing rod.

Figure 8:
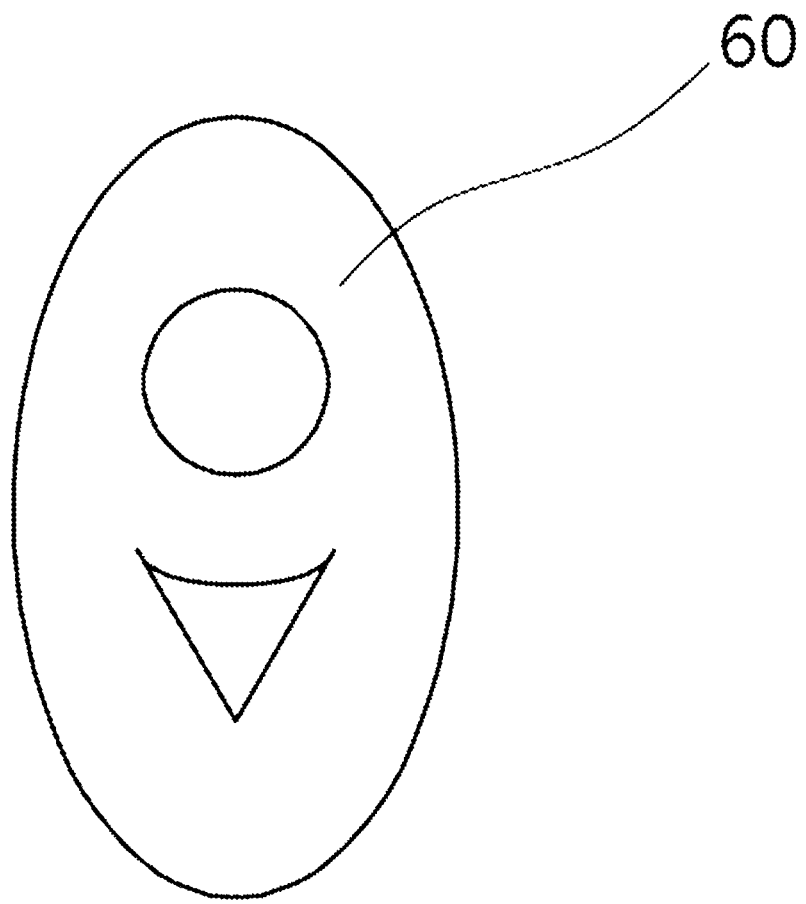
FIG. 8 is a view showing a product completed using a jig instead of second mandrel in the method of manufacturing a product having a complex shape by using at least one jig and at least one mandrel according to the first embodiment of the present invention.
Figure 9:
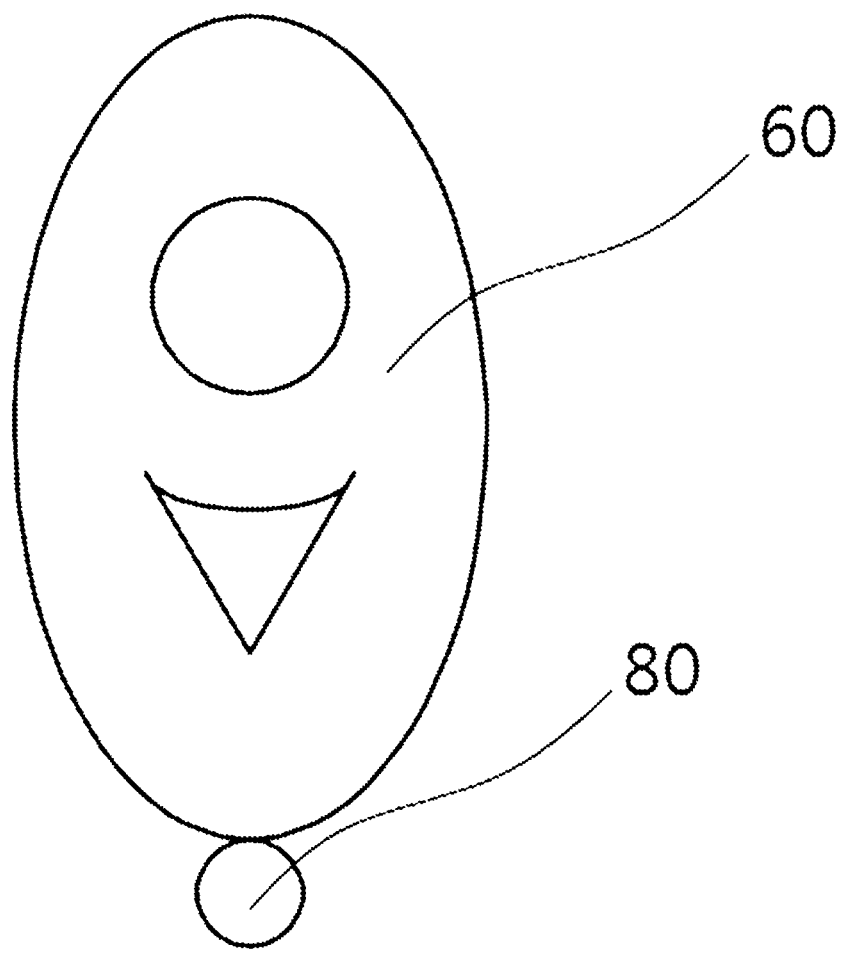
FIG. 9 is a view showing the third mandrel preparation step of the method of manufacturing a product having a complex shape by using at least one jig and at least one mandrel according to the first embodiment of the present invention.
Figure 10:
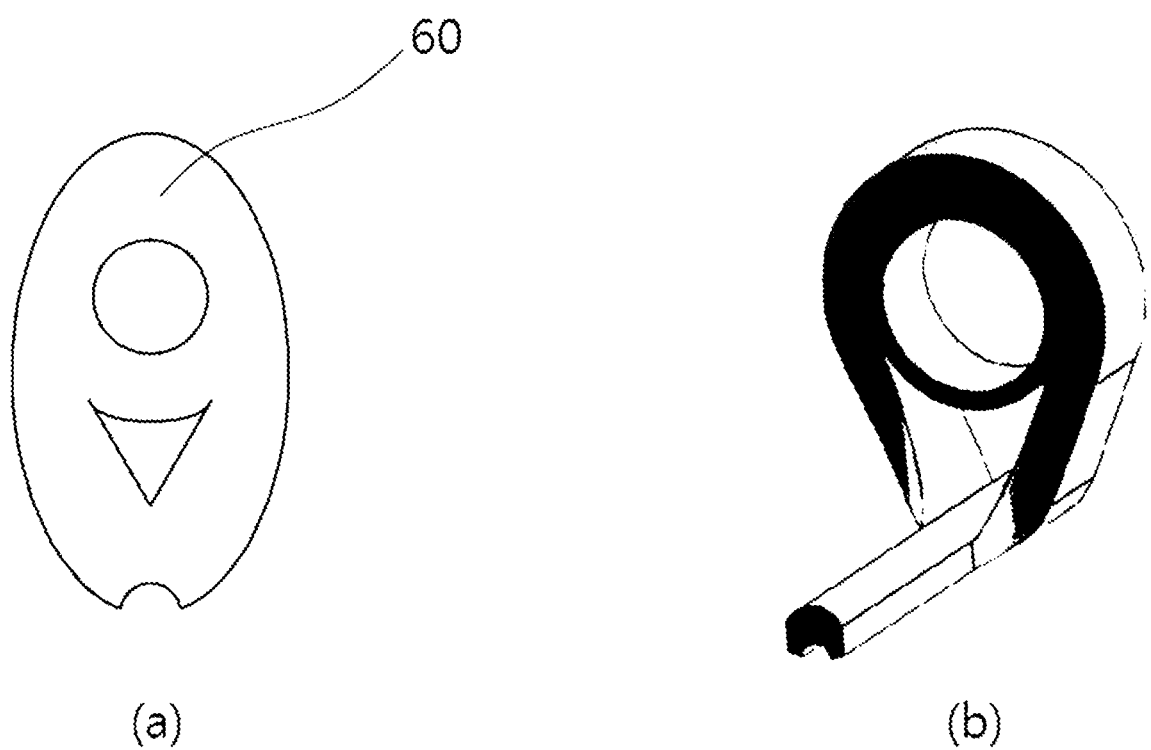
FIG. 10 is a view showing the appearance of a product completed after the third heating step of the method of manufacturing a product having a complex shape by using at least one jig and at least one mandrel according to the first embodiment of the present invention has been performed, and also showing the appearance of a strip guide of a fishing rod formed through separate machining.

Next, as shown in FIGS. 8 to 10, when the jig is used instead of the second mandrel 30 at the second mandrel preparation step 140, a third mandrel preparation step 180 and a third heating step 190 may be included after the core removal step 170 has been performed.

The third mandrel preparation step 180 is the step of locating a third mandrel 80 on the outer circumferential surface of the second stacking surface 50, as shown in FIG. 9. The third mandrel 80 may be formed in various shapes.

The third heating step 190 is the step of taping and heating the second stacking surface 50 and the third mandrel 80. At the third heating step 190, a depression attributable to the pressing action of the third mandrel 80 is formed on the outer circumferential surface of the second stacking surface 50 by applying heat onto the second stacking surface 50.

Figure 11:
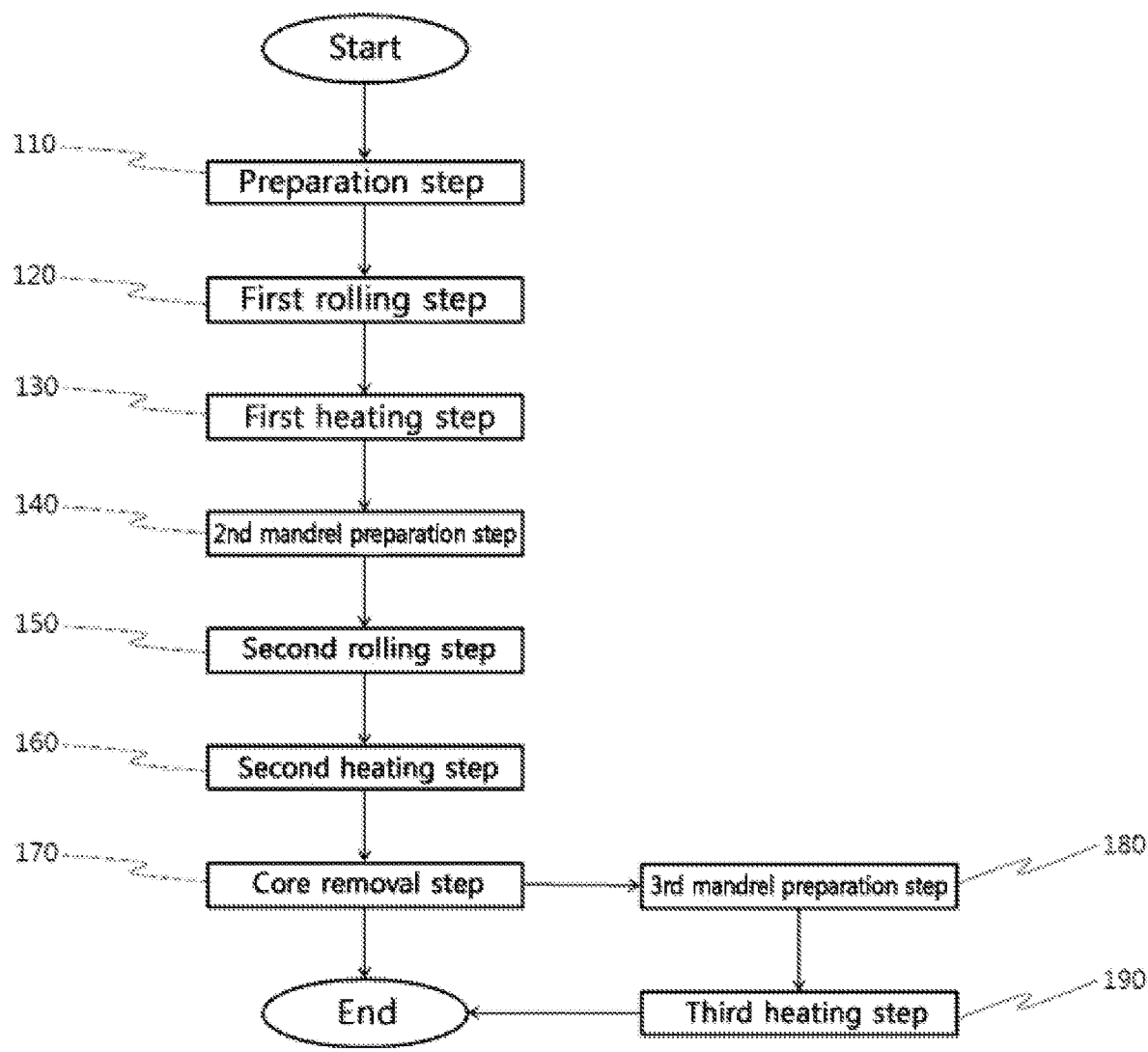
FIG. 11 is a block diagram showing the manufacturing steps of the method of manufacturing a product having a complex shape by using at least one jig and at least one mandrel according to the first embodiment of the present invention.

After the third heating step 190 has been performed, tape and the third mandrel 80 are removed, and final machining into a desired shape is performed. The shape of a product obtained after the third heating step 190 has been performed is shown in FIG. 10. The product of FIG. 10 may be finally machined, may be used as a strip guide of a fishing rod, as shown in FIG. 11, and may be easily attached or installed on the fishing rod.

Second Embodiment

As shown in FIGS. 12 to 15, a method of manufacturing a product having a complex shape by using at least one jig and at least one mandrel according to a second embodiment may be configured to include a preparation step 210, a first rolling step 220, a second mandrel preparation step 230, a pressing step 240, a heating step 250, and a core removal step 260.

First, the preparation step 210 is the step of preparing a prepreg sheet 10 and a cylindrical first mandrel 20 around which the prepreg sheet 10 is wound.

Next, the first rolling step 220 is the step of forming a first stacking surface 40 by winding the prepreg sheet 10 around the first mandrel 20.

Figure 12:
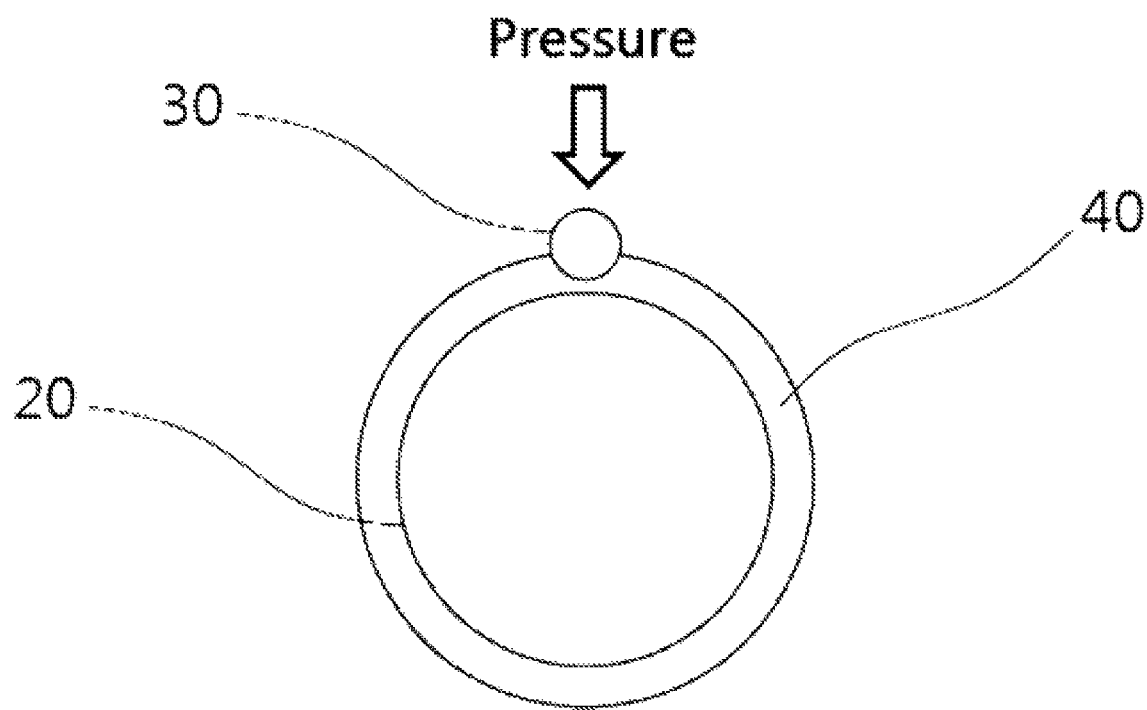
FIG. 12 is a view showing the second mandrel preparation step of a method of manufacturing a product having a complex shape by using at least one jig and at least one mandrel according to a second embodiment of the present invention.

Next, the second mandrel preparation step 230 is the step of locating a second mandrel 30 on the outer circumferential surface of the first stacking surface 40, as shown in FIG. 12.

Next, the pressing step 240 is the step of taping the first stacking surface 40 and the second mandrel 30, as shown in FIG. 12.

Next, the heating step 250 is the step of heating the first stacking surface 40 and the second mandrel 30.

Figure 13A:
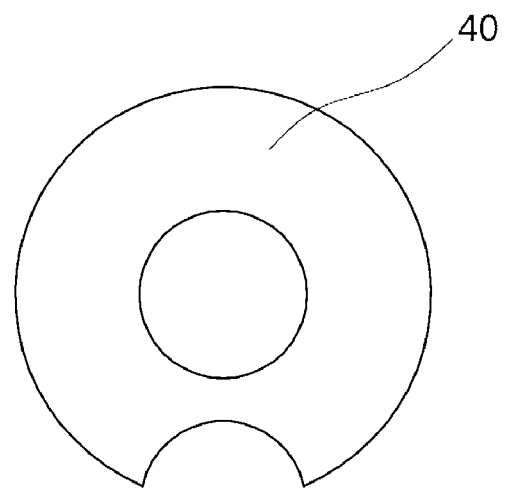
FIG. 13(a) is a view showing the appearance of a product completed using the method of manufacturing a product having a complex shape by using at least one jig and at least one mandrel according to the second embodiment of the present invention, and FIG. 13(b) also shows the appearance of a one-neck guide of a fishing rod formed through separate machining.
Figure 13B:
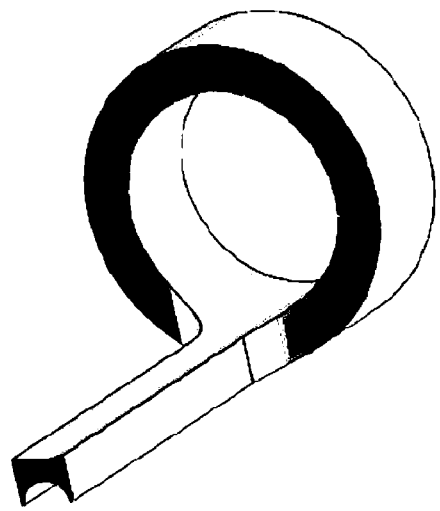

Next, the core removal step 260 is the step of removing the first mandrel 20, the second mandrel 30, and tape. A product completed by performing the core removal step 260 is shown in FIG. 13a. The product of FIG. 13a may be formed into a one-neck guide of a fishing rod after separate machining, as shown in FIG. 13b. A depression formed by the second mandrel 20 enables the one-neck guide to be easily installed on the fishing rod.

The method of manufacturing a product having a complex shape by using at least one jig and at least one mandrel according to the second embodiment is basically the same in a material used, steps, and the details of the steps as the method of manufacturing a product having a complex shape by using at least one jig and at least one mandrel according to the first embodiment, but they are different in the sequence of the steps from each other.

Figure 14:
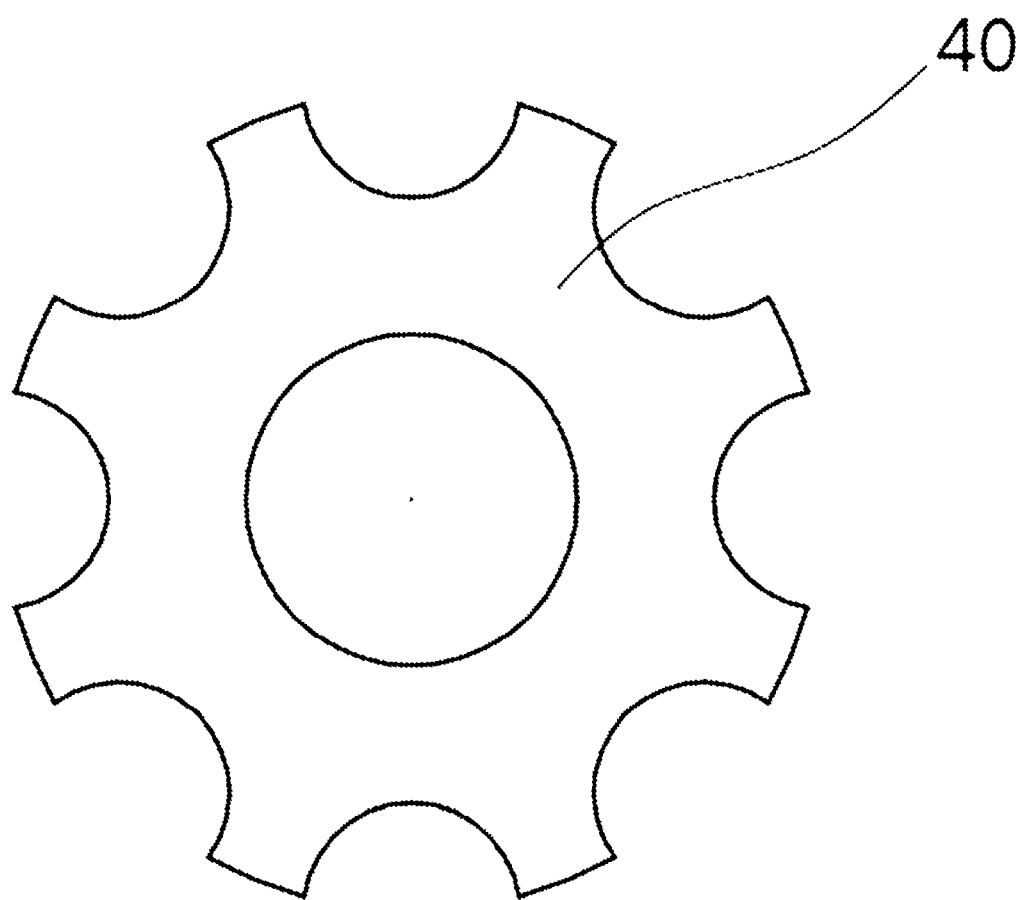
FIG. 14 is a view showing the appearance of a product completed using a plurality of second mandrels in the method of manufacturing a product having a complex shape by using at least one jig and at least one mandrel according to the second embodiment of the present invention.
Figure 15:
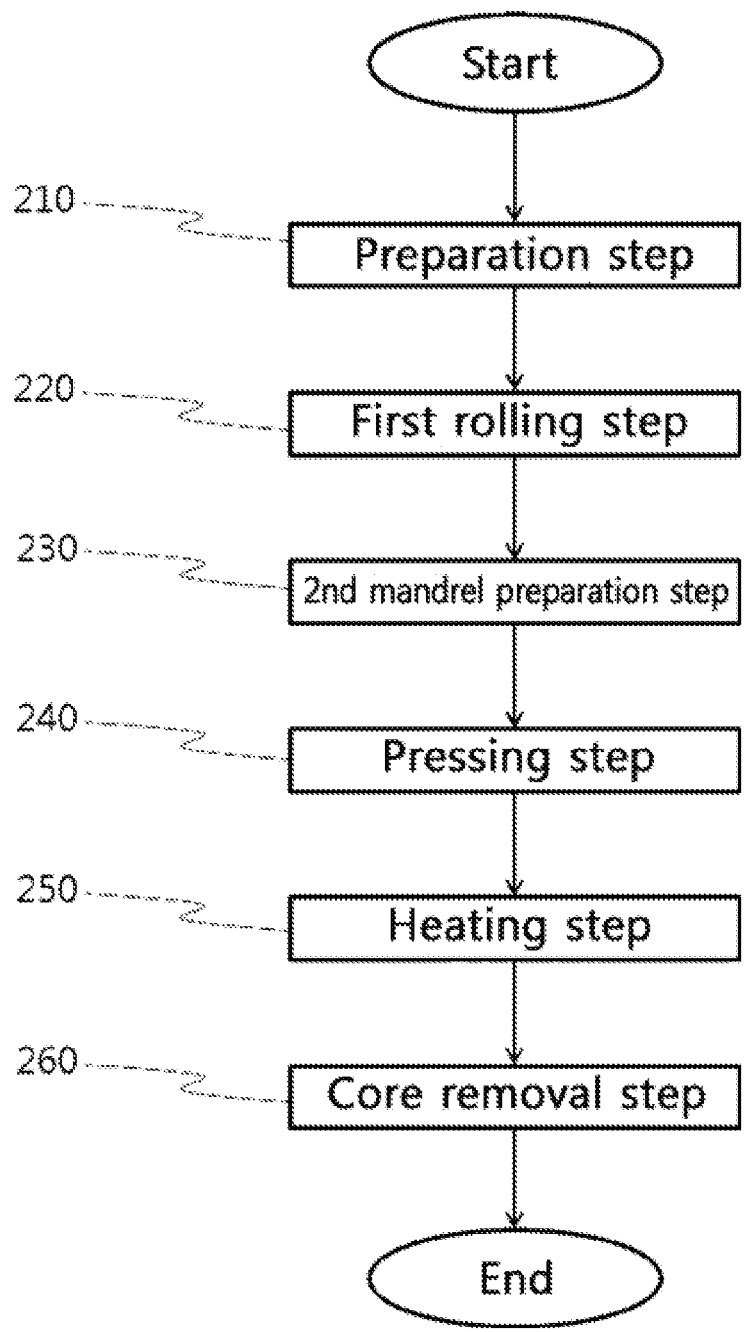
FIG. 15 is a block diagram showing the manufacturing steps of the method of manufacturing a product having a complex shape by using at least one jig and at least one mandrel according to the second embodiment of the present invention.

As shown in FIG. 14, a plurality of depressions may be formed on the outer circumferential surface of the first stacking surface 40 by using a plurality of second mandrels 30. Due to the plurality of depressions, when a product is machined into a fishing rod, a golf club, or the like, a sound can be generated whenever the product is swung, and the strength of the product can be further enhanced.

As described above, it will be understood that those skilled in the art to which the present invention pertains may practice the above-described technical configuration of the present invention in other specific forms without changing the technical spirit and essential features of the present invention.

Therefore, it should be understood that the above-described embodiments are illustrative but are not limitative in all aspects, the scope of the present invention is defined by the following claims rather than the detailed description, and all modifications and variations derived from the meanings and ranges of the claims and concepts equivalent to the claims should be construed as falling within the scope of the present invention.

The invention claimed is:

1. A method of manufacturing a product having a complex shape, the method comprising:
    a preparation step of preparing a prepreg sheet and a first cylindrical mandrel around which the prepreg sheet is wound;
    a first rolling step of forming a first stacking surface by winding the prepreg sheet around the first cylindrical mandrel;
    a first heating step of taping and heating the first stacking surface;
    a second mandrel preparation step of removing the tape and locating a second cylindrical mandrel on an outer circumferential surface of the first stacking surface;
    a second rolling step of forming a second stacking surface by winding the first stacking surface and the second cylindrical mandrel with the prepreg sheet;
    a second heating step of taping and heating the second stacking surface; and
    a core removal step of removing the first cylindrical mandrel and the second cylindrical mandrel,
    wherein the second rolling step comprises forming a hole between the first stacking surface and the second stacking surface, and
    wherein the second heating step comprises combining the first stacking surface and the second stacking surface to form a combined stacking surface, thereby filling up the hole.

2. The method of claim 1,
    further comprising, after the core removal step;
    a third mandrel preparation step of locating a third mandrel on an outermost circumferential surface of the second stacking surface; and
    a third heating step of heating the second stacking surface and the third mandrel.

\* \* \* \* \*